United States Patent [19]
Pena et al.

[11] Patent Number: 5,568,903
[45] Date of Patent: Oct. 29, 1996

[54] PLANE SADDLE FOR A SAFETY AIRPLANE

[76] Inventors: Jesus S. Pena; Julia M. Williams; Joe L. Williams, all of 1939 Grand Concourse; Apt. 3M, Bronx, N.Y. 10453

[21] Appl. No.: 374,085

[22] Filed: Jan. 18, 1995

[51] Int. Cl.$^6$ .................................................. B64C 1/32
[52] U.S. Cl. .......................................... 244/140; 244/139
[58] Field of Search ............................... 244/140, 138 R, 244/139

[56] References Cited

U.S. PATENT DOCUMENTS

| | | | |
|---|---|---|---|
| 3,227,399 | 1/1966 | Dastoli et al. | 244/140 X |
| 3,377,037 | 4/1968 | Stewart | 244/140 X |
| 3,508,727 | 4/1990 | Willens | 244/140 |
| 3,703,265 | 11/1972 | Troitino | 244/140 X |
| 3,817,263 | 6/1974 | Bendler et al. | 137/68.1 |
| 3,822,895 | 7/1974 | Ochiai | 280/737 |
| 3,901,530 | 8/1975 | Radke | 280/741 |
| 4,104,092 | 8/1978 | Mullay | 149/2 |
| 4,306,693 | 12/1981 | Cooper | 244/135 R |
| 4,649,336 | 10/1987 | Diamond | 244/140 |
| 4,734,141 | 3/1988 | Cartwright et al. | 280/741 |
| 5,060,973 | 10/1991 | Giovanetti | 280/736 |
| 5,263,740 | 11/1993 | Frey et al. | 280/737 |
| 5,290,060 | 3/1994 | Smith | 280/737 |
| 5,330,730 | 7/1994 | Brede et al. | 422/305 |
| 5,344,186 | 9/1994 | Bergerson | 280/741 |
| 5,345,872 | 9/1994 | Takahashi et al. | 280/741 |
| 5,348,344 | 9/1994 | Blumenthal et al. | 280/737 |
| 5,350,192 | 9/1994 | Blumenthal | 280/737 |
| 5,356,176 | 10/1994 | Wells | 280/737 |
| 5,364,127 | 11/1994 | Cuevas | 280/741 |

FOREIGN PATENT DOCUMENTS

| | | |
|---|---|---|
| 0540013 | 5/1993 | European Pat. Off. . |
| 0604001 | 6/1994 | European Pat. Off. . |
| 1051874 | 1/1954 | France .................. 244/140 |
| 2112006 | 8/1977 | Germany . |
| 4135547 | 4/1993 | Germany . |
| 4135776 | 5/1993 | Germany . |
| 2270742 | 3/1994 | United Kingdom . |

*Primary Examiner*—Christopher P. Ellis
*Attorney, Agent, or Firm*—Michael I. Kroll

[57] ABSTRACT

A safety airplane comprising a carrier portion and a saddle portion. An assembly is for retaining the saddle portion on the carrier portion. A structure is for releasing the saddle portion from the carrier portion, when there is a problem during flight. Paraphernalia is for gently lowering the saddle portion to the ground.

6 Claims, 3 Drawing Sheets

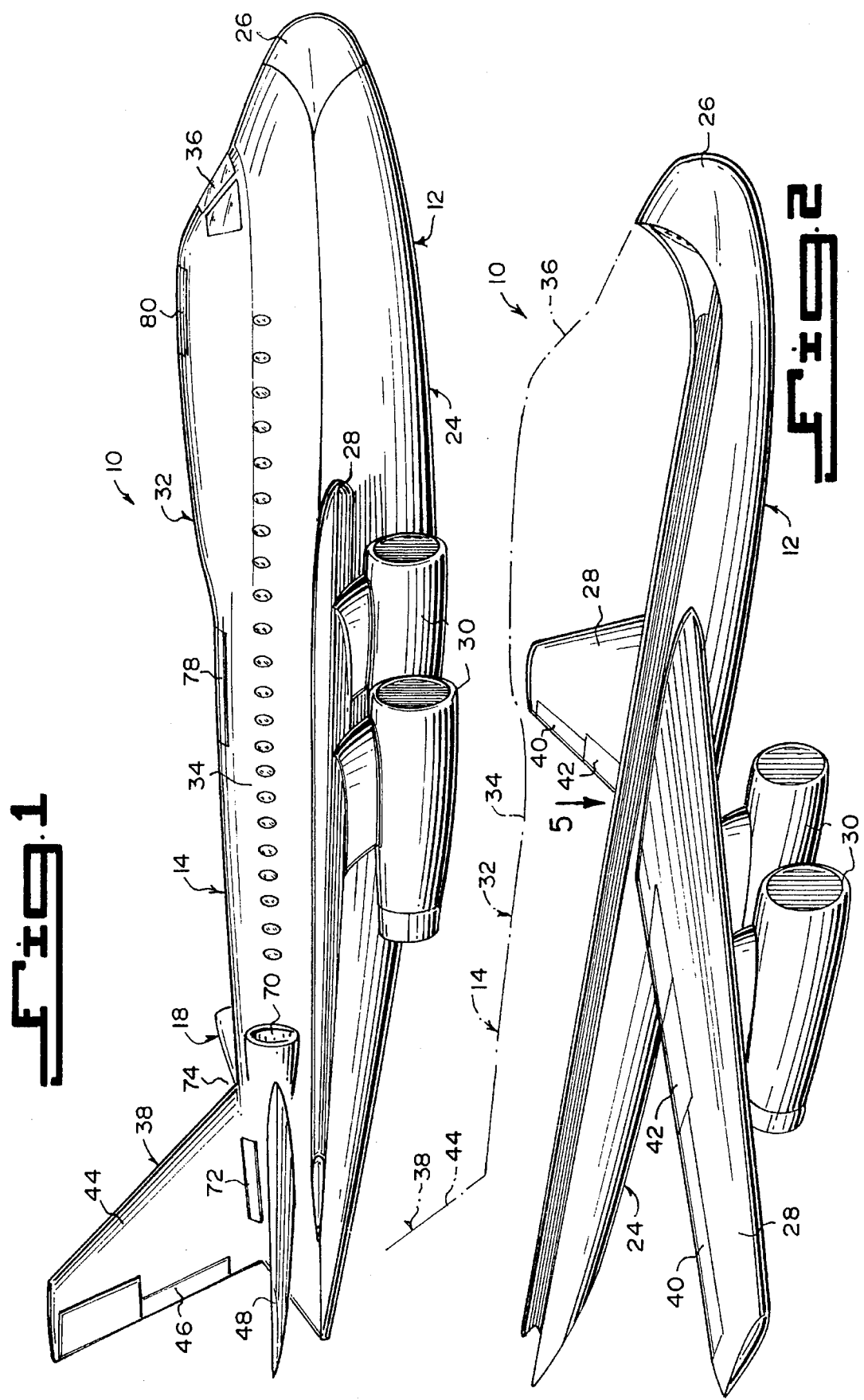

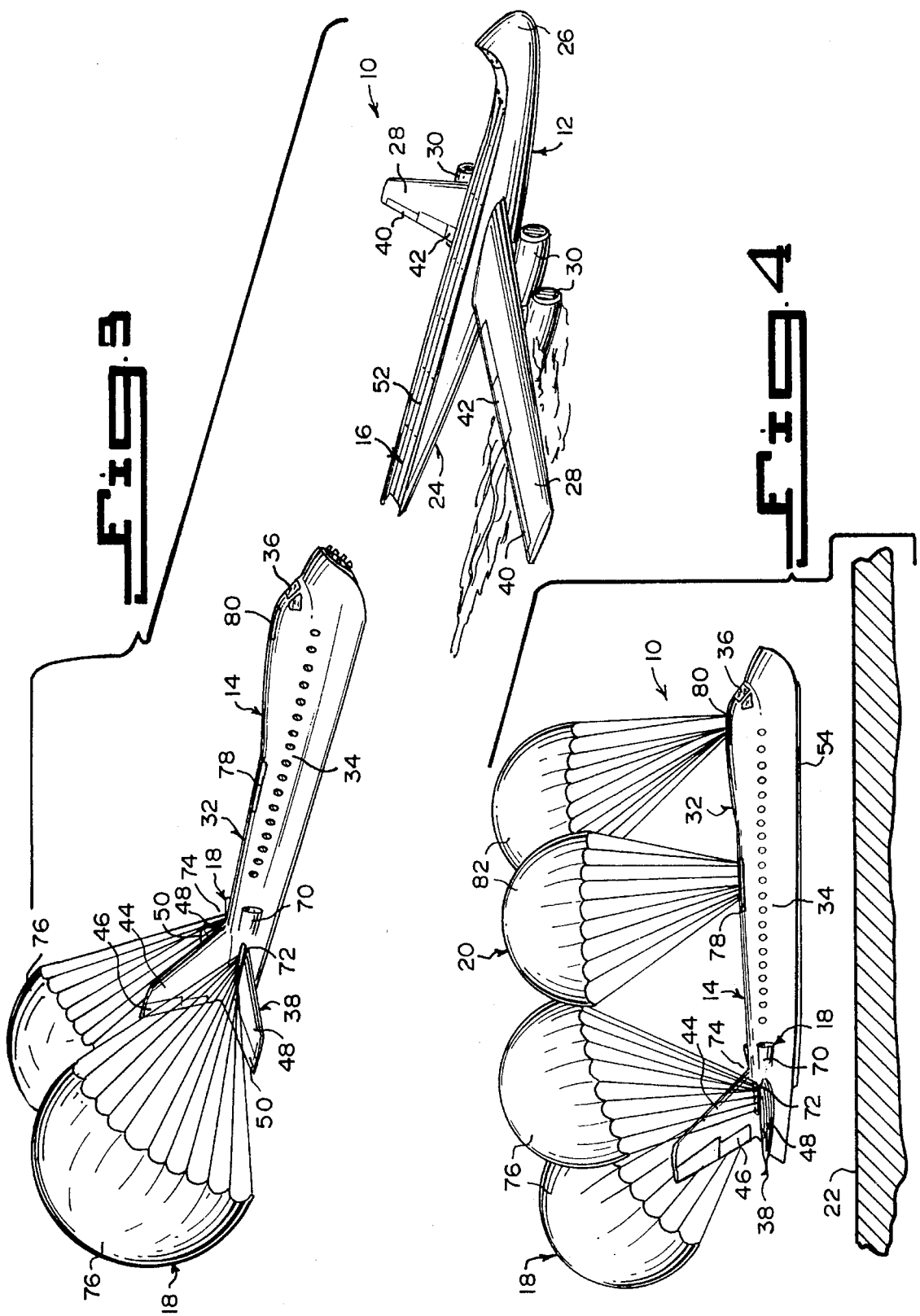

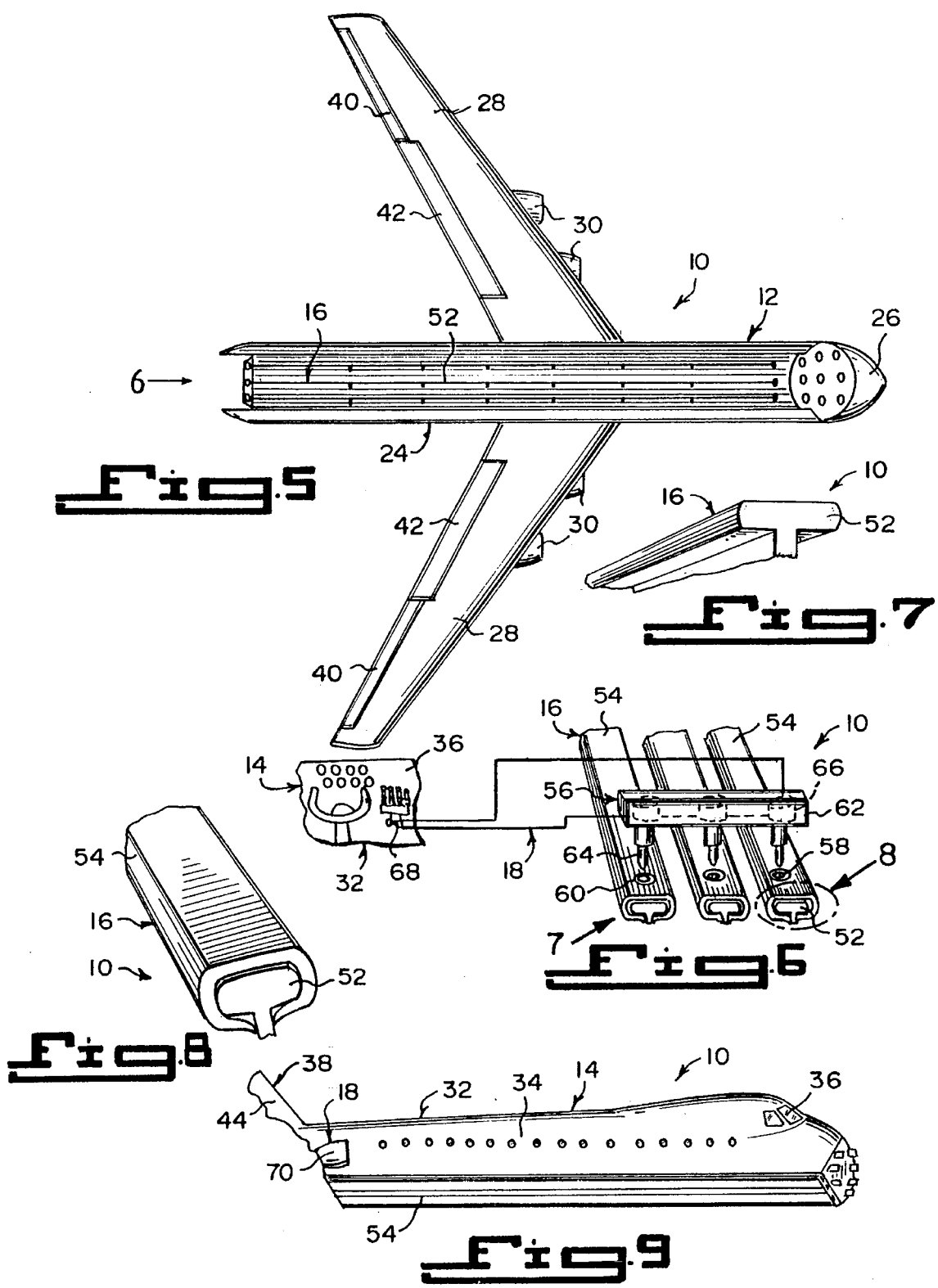

5,568,903

PLANE SADDLE FOR A SAFETY AIRPLANE

BACKGROUND OF THE INVENTION

1. Field of the Invention

The instant invention relates generally to aircraft emergency equipment and more specifically it relates to a plane saddle for a safety airplane.

2. Description of the Prior Art

Numerous aircraft emergency equipment have been provided in prior art that are adapted to prevent death and injury to the crew and passengers, when the aircraft is in danger of crashing. While these units may be suitable for the particular purpose to which they address, they would not be as suitable for the purposes of the present invention as heretofore described.

SUMMARY OF THE INVENTION

A primary object of the present invention is to provide a plane saddle for a safety airplane that will overcome the shortcomings of the prior art devices.

Another object is to provide a plane saddle for a safety airplane that contains a saddle portion having the cabin and cockpit therein, which will separate from the carrier portion having the wings with the engines when there is a problem during flight, such as plunging to earth and crashing.

An additional object is to provide a plane saddle for a safety airplane whereby when danger is perceived, the pilot in the cockpit can release the saddle portion from the carrier portion and deploy four parachutes, to gently lower the saddle portion to the ground.

A further object is to provide a plane saddle for a safety airplane that is simple and easy to use.

A still further object is to provide a plane saddle for a safety airplane that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a perspective view of the instant invention.

FIG. 2 is a perspective view of the carrier portion with the saddle portion shown in phantom.

FIG. 3 is a perspective view showing the saddle portion separated from the carrier portion.

FIG. 4 is a side view showing all of the parachutes deployed in lowering the saddle portion to the ground.

FIG. 5 is a top view of the carrier portion as indicated by arrow 5 in FIG. 2.

FIG. 6 is a diagrammatic view partly in perspective and broken away as taken generally in the direction of arrow 6 in FIG. 5, showing the mechanism within the airplane to separate the sleeves of the saddle portion from the rails of the carrier portion.

FIG. 7 is a bottom perspective of one of the rails in the carrier portion taken in the direction of arrow 7 in FIG. 6.

FIG. 8 is an enlarged perspective view as indicated by arrow 8 of the area in FIG. 6.

FIG. 9 is a side view with parts broken away of the saddle portion showing the three sleeves attached thereto.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 9 illustrate a safety airplane 10, comprising a carrier portion 12 and a saddle portion 14. An assembly 16 is for retaining the saddle portion 14 on the carrier portion 12. A structure 18 is for releasing the saddle portion 14 from the carrier portion 12, when there is a problem during flight. Paraphernalia 20 is for gently lowering the saddle portion 14 to the ground 22.

The carrier portion 12 includes a lower fuselage 24, having a nose cone 26 thereon. A pair of wings 28 are attached to the lower fuselage 24. A plurality of engines 30 are on the wings 26.

The saddle portion 14 contains an upper fuselage 32 having a cabin 34 and a cockpit 36 therein for a pilot and passengers. A tail assembly 38 is on a back end of the upper fuselage 32.

The wings 28 include ailerons 40 and flaps 42, to help control movement of the airplane 10. The tail assembly 28 contains a vertical tail fin 44, a rudder 46 on the tail fin 44, a pair of horizontal stabilizers 48 and elevators 50 on the horizontal stabilizer 48, to help control movement of the airplane 10.

The retaining assembly 16, as best seen in FIGS. 6, 7 and 8, consists of a plurality of rails 52 that are affixed and extend in longitudinal parallel relationships within the lower fuselage 24 of the carrier portion 12. A plurality of sleeves 54 are affixed and extend in longitudinal parallel relationships under the upper fuselage 32 of the saddle portion 14. The sleeves slide onto an a engage with the rails 52. A facility 56 is for locking the sleeves 54 onto the rails 52.

The locking facility 56 includes each rail 52 having a socket 58 therein. Each sleeve 54 has an aperture 60 therein. When the sleeves 54 fully engage with the rails 52, the apertures 60 will be in alignment with the sockets 58. A harness 62 is mounted in the upper fuselage 32 transversely over the apertures 60 in the sleeves 54. A plurality of pins 64 extend downwardly from the harness 62 through the apertures 60 in the sleeves 54 and into the sockets 58 in the rails 52, thereby locking the sleeves 54 on the rails 52.

The structure 18 consists of a plurality of solenoids 66 carried within the harness 62. The pins 64 are telescopic and operable by the solenoids 66. An emergency actuating switch 68 is placed within the cockpit 36 in the upper fuselage 32 of the saddle portion 14 and is electrically connected to all of the solenoids 66. When the pilot energizes the emergency actuating switch 68, the solenoids 66 will retract the pins 64 out of the sockets 58 in the rails 52 and the apertures 60 in the sleeves 54, allowing the sleeves 54 to slide off of the rails 52.

The releasing structure 18 further contains a pair of stabilizing reverse thrust engines 70. Each engine 70 is mounted on opposite sides of the upper fuselage 32 of the saddle portion 14 adjacent the horizontal stabilizers 48, so as to accelerate the separation of the saddle portion 14 from the carrier portion 62.

The releasing structure 18 further includes the upper fuselage 32 of the saddle portion 14 having two storage compartments 72, 74 located on opposite sides between the vertical tail fin 44 and the horizontal stabilizers 48. A pair of extraction parachutes 76 are carried within said first and second storage compartments 72, 74. The extraction parachutes 76 are deployed therefrom, to help pull the sleeves 54 of the saddle portion 14 along and off of the rails 52 of the carrier portion 12. The saddle portion 14 will move longitudinally away from a back portion of the lower fuselage 24 of the carrier portion 12, as shown in FIG. 3.

The gently lowering paraphernalia 20 consists of the upper fuselage 32 of the saddle portion 14 having third and fourths storage compartments 78, 80. The third storage compartment 78 is located approximately midway over the cabin 34. The fourth storage compartment 80 is located over the cockpit 36. A pair of recovery parachutes 82 are carried within the third and fourth storage compartments 78, 80. The recovery parachutes 82 are deployed therefrom, to allow the saddle portion 14 to descend down in an even position to the ground 22, as shown in FIG. 4.

LIST OF REFERENCE NUMBERS 10 safety airplane
12 carrier portion of 10
14 saddle portion of 10
16 retaining assembly
18 releasing structure
20 gently lowering paraphernalia
22 ground
24 lower fuselage of 12
26 nose core of 24
28 wing on 24
30 engine on 28
32 upper fuselage of 14
34 cabin in 32
36 cockpit in 32
38 tail assembly on 32
40 aileron on 28
42 flap on 28
44 vertical tail fin of 28
46 rudder on 44
48 horizontal stabilizer of 28
50 elevator on 48
52 rail on 24
54 sleeve on 32
56 locking facility
58 socket in 52
60 aperture in 54
62 harness in 32
64 pin
66 solenoid in 62
68 emergency actuating switch in 36 to 66
70 stabilizing reverse thrust engine of 18 on 32
72 first storage compartment in 32
74 second storage compartment in 32
76 extraction parachute in 72, 74
78 third storage compartment in 32
80 fourth storage compartment in 32
82 recovery parachute in 78, 80

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A safety airplane comprising:
   a) a carrier portion, said carrier portion including a lower fuselage having a nose cone thereon, a pair of wings attached to said lower fuselage, and a plurality of engines on said wings, said wings including ailerons and flaps to help control movement of said airplane;
   b) a saddle portion, said saddle portion including an upper fuselage having a cabin and a cockpit therein for a pilot and passengers, and a tail assembly on a back end of said upper fuselage, said tail assembly including a vertical tail fin, a rudder on said tail fin, a pair of horizontal stabilizers, and an elevator on said horizontal stabilizer to help control movement of said airplane;
   c) means for retaining said saddle portion on said carrier portion, said retaining means including a plurality of rails affixed and extending in longitudinal parallel relationships within said lower fuselage of said carrier portion, a plurality of sleeves affixed and extending in longitudinal parallel relationships under said upper fuselage of said saddle portion, whereby said sleeves slide onto and engage with said rails, and means for locking said sleeves onto said rails;
   d) means for releasing said saddle portion from said carrier portion when there is a problem during flight; and
   e) means for gently lowering said saddle portion to the ground.

2. A safety airplane as recited in claim 1, wherein said locking means includes:
   a) each said rail having a socket therein;
   b) each said sleeve having an aperture therein, so that when said sleeves fully engage with said rails, said apertures will be in alignment with said sockets;
   c) a harness mounted in said upper fuselage transversely over said apertures in said sleeves; and
   d) a plurality of pins that extend downwardly from said harness through said apertures in said sleeves and into said sockets in said rails, thereby locking said sleeves on said rails.

3. A safety airplane as recited in claim 2, wherein said releasing means includes:
   a) a plurality of solenoids carried within said harness;
   b) said pins being telescopic and operable by said solenoids; and c) an emergency actuating switch placed within said cockpit in said upper fuselage of said saddle portion and electrically connected to all of said solenoids, so that when the pilot energizes said emergency actuating switch, said solenoids will retract said pins out of said sockets in said rails and said apertures in said sleeves, allowing said sleeves to slide off of said rails.

4. A safety airplane as recited in claim 3, wherein said releasing means further includes a pair of stabilizing reverse thrust engines, each mounted on opposite sides of said upper fuselage of said saddle portion adjacent said horizontal stabilizers, so as to accelerate the separation of said saddle portion from said carrier portion.

5. A safety airplane as recited in claim 4, wherein said releasing means further includes:

a) said upper fuselage of said saddle portion having two storage compartments located on opposite sides between said vertical tail fin and said horizontal stabilizers; and b) a pair of extraction parachutes carried within said first and second storage compartments and deployed therefrom to help pull said sleeves of said saddle portion along and off of said rails of said carrier portion, so that said saddle portion will move longitudinally away from a back portion of said lower fuselage of said carrier portion.

6. A safety airplane as recited in claim 5, wherein said gently lowering means includes:

a) said upper fuselage of said saddle portion having third and fourth storage compartments, with said third storage compartment located approximately midway over said cabin and said fourth storage compartment located over said cockpit; and b) a pair of recovery parachutes carried within said third and fourth storage compartments and deployed therefrom, to allow said saddle portion to descend down in an even position to the ground.

* * * * *